March 8, 1927.

E. T. CUNNINGHAM

FREIGHT CAR

Filed May 2, 1925

1,619,920

INVENTOR
Earl T. Cunningham
BY
Blackmore, Spencer & Flint
ATTORNEYS

Patented Mar. 8, 1927.

1,619,920

UNITED STATES PATENT OFFICE.

EARL T. CUNNINGHAM, OF LANSING, MICHIGAN.

FREIGHT CAR.

Application filed May 2, 1925. Serial No. 27,519.

This invention relates to freight cars and is illustrated as embodied in a box car used in shipping automobiles.

The present method used in shipping automobiles is to "double-deck" the automobiles in a box car, that is, one is supported or "decked" with clearance beneath for a second automobile on the floor.

Considerable difficulty has been experienced in lifting the upper automobile to the decking position. A stringer located in the roof of the box car is often used to support a chain fall used to lift the automobile, but the continual use of this construction tends to crack this woodwork and make it unfit for holding the automobile up in place while the decks are assembled beneath.

An important object of this invention is to provide freight cars with novel permanent steel stringers which replace the wooden stringers. Preferably the permanent stringers are made of a steel channel with the flanges turned inwardly to support means such as a sliding block to which can be attached a chain fall or other device for use in lifting the automobile.

The above and other objects and features of the invention, including various novel combinations and desirable particular constructions, will be apparent from the following description of the illustrated embodiment shown in the accompanying drawings, in which.

Figure 1:
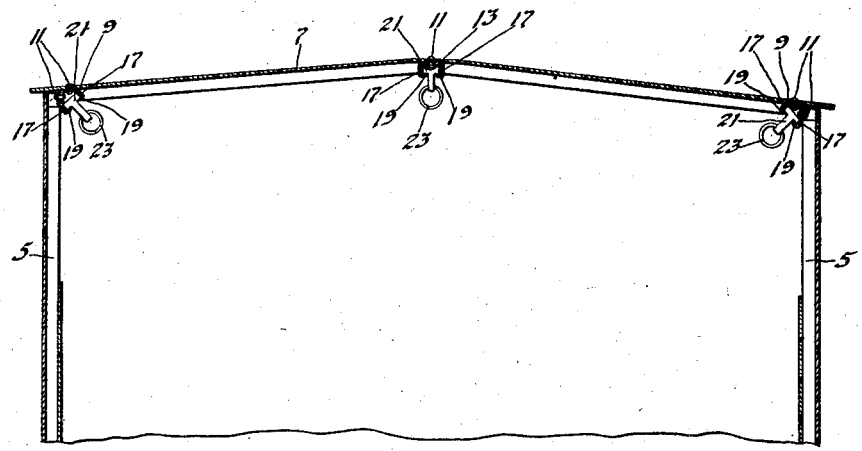
Figure 1 is a vertical transverse section through a freight car, showing in section the channels and sliding blocks.
Figure 2:
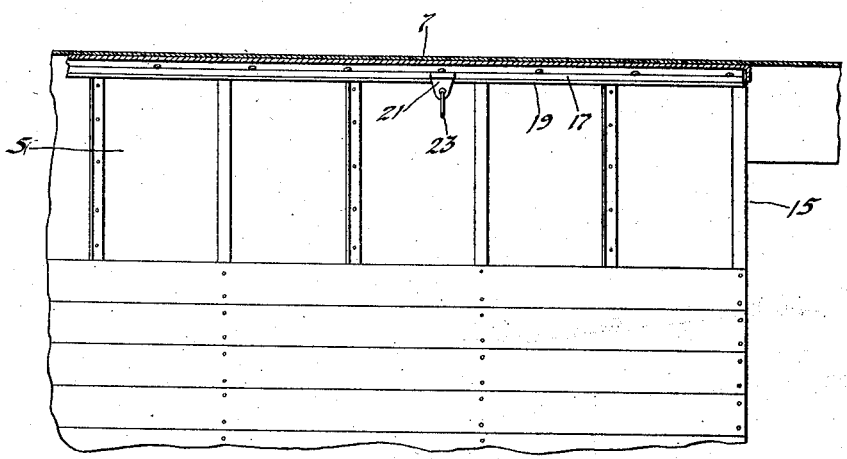
Figure 2 is a longitudinal sectional view of the car at right angles to Figure 1, showing the channels in side elevation and extending to the door.

As shown in Figure 1 the side walls 5 of the freight car are attached to the roof 7 through the channels 9 by rivets 11 and form a part of the freight car structure. Another channel 13 is shown at the center of the roof forming the center stringer. The channels 9 and 13, as shown in Figure 1, extend longitudinally the full length of the car, but may, if desired, only extend from each end of the car to the door 15 as shown in Figure 2.

For all practical purposes the channels are alike with the exception that the corner channels are made to fit the corner and are directed diagonally while the center channel is directed downwardly and has a flat base which is attached to the roof.

The lower edge of the flanges 17 of each channel are bent inwardly as at 19 to form a track or support for a T-shaped block 21, or an equivalent member, adapted to slide in the channel from one end to the other. A ring 23 is shown carried by the block 21, to which may be secured a chain fall or block and tackle or the like, used in lifting an automobile.

In loading automobiles with the above described lifting means, the chain fall is hooked in the ring 23 and the block 21 slid to a position over the automobile. One or more blocks 21, and a corresponding number of chain falls or the like, may be used. The automobile is then lifted to "decking" position where it is secured. The chain fall is then removed from the automobile and slid with the block 21 to a position suitable for lifting the next automobile. After the automobiles have all been "decked" the chain fall is removed from the ring 23 in the block 21, and the channels, blocks, and rings remain in the car as permanent equipment to be used when the automobiles are unloaded and when the next shipment is loaded.

While one embodiment of my invention has been illustrated and described, it is not my intention to limit its scope to that particular embodiment, or otherwise than by the terms of the appended claims.

I claim:

1. A freight car having, in combination, a roof supported by a pair of side walls, a channel shaped stringer supporting a part of said roof, a T-shaped block carried by inturned flanges on said stringer and slidable therein, and a ring carried by said block.

2. A freight car having, in combination, a roof, a pair of sidewalls, channels carried by said roof and sidewalls, a T-shaped block carried by inturned opposite flanges of each of said channels and slidable therein, and a ring carried by each of said blocks.

3. A freight car having, in combination, a roof, a pair of sidewalls, a channel depending from said roof, inturned opposite flanges on said channel, a block carried by said channel and slidable therein, and a ring carried by said block.

4. A freight car having, in combination, a roof, a pair of sidewalls, a channel securing said roof to one of said sidewalls, and a supporting device movably carried by flanges on said channel.

5. A freight car having, in combination, a roof, a pair of sidewalls, longitudinally extending track members located inside the car and extending along the outer edges of the roof and upper edges of the side walls, and supporting members movable longitudinally of the track members.

In testimony whereof I affix my signature.

E. T. CUNNINGHAM.